United States Patent
Dinkel et al.

(10) Patent No.: US 6,851,755 B2
(45) Date of Patent: Feb. 8, 2005

(54) PADDING FOR SEATS, IN PARTICULAR VEHICLE SEATS

(75) Inventors: Emil Dinkel, Renningen (DE); Ewald Guenther, Boeblingen (DE); Juergen Schrader, Weil im Schoenbuch (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/243,946

(22) Filed: Sep. 16, 2002

(65) Prior Publication Data

US 2003/0071500 A1 Apr. 17, 2003

(30) Foreign Application Priority Data

Sep. 15, 2001 (DE) .......................................... 101 45 627

(51) Int. Cl.$^7$ .............................. A47C 7/14; A47C 4/54
(52) U.S. Cl. ........................... 297/452.48; 297/452.41; 297/452.58; 297/452.59; 297/284.3; 297/284.6; 297/DIG. 3
(58) Field of Search ................ 297/452.48, 452.41, 297/284.2, 284.3, 284.6, DIG. 3, 452.58, 452.59, 218.2, 291.58, 297.59

(56) References Cited

U.S. PATENT DOCUMENTS

| | | | | | |
|---|---|---|---|---|---|
| 3,191,197 A | * | 6/1965 | Frey | ................... | 297/DIG. 3 X |
| 3,330,598 A | * | 7/1967 | Whiteside | ................. | 297/284.6 |
| 3,679,263 A | * | 7/1972 | Cadiou | ................... | 297/452.48 |
| 3,983,640 A | * | 10/1976 | Cardullo et al. | ..... | 297/284.3 X |
| 4,059,909 A | * | 11/1977 | Kron | ................. | 297/DIG. 3 X |
| 4,078,842 A | * | 3/1978 | Zur | ...................... | 297/284.6 X |
| 4,655,505 A | * | 4/1987 | Kashiwamura | .......... | 297/284.6 |
| 4,747,638 A | * | 5/1988 | Saito | .................. | 297/452.59 X |
| 4,927,209 A | * | 5/1990 | Maruyama | ......... | 297/452.58 X |
| 4,969,684 A | * | 11/1990 | Zarotti | .............. | 297/DIG. 3 X |
| 5,029,939 A | | 7/1991 | Smith et al. | | |
| 5,052,068 A | * | 10/1991 | Graebe | .............. | 297/DIG. 3 X |
| 5,662,384 A | * | 9/1997 | O'Neill | ................. | 297/452.41 |
| 5,881,407 A | * | 3/1999 | Chu Pt | ............. | 297/452.41 X |
| 5,893,184 A | * | 4/1999 | Murphy | ................. | 297/452.41 |
| 5,927,807 A | * | 7/1999 | Heller | ............... | 297/452.41 X |
| 6,203,105 B1 | * | 3/2001 | Rhodes, Jr. | .............. | 297/284.6 |
| 6,212,719 B1 | * | 4/2001 | Thomas et al. | ..... | 297/452.41 X |
| 6,256,819 B1 | | 7/2001 | Maier et al. | | |
| 6,273,810 B1 | * | 8/2001 | Rhodes, Jr. et al. | | 297/452.47 X |
| 6,546,578 B1 | * | 4/2003 | Steinmeier | ......... | 297/452.48 X |
| 6,578,916 B2 | * | 6/2003 | Longhi et al. | ....... | 297/284.6 X |

FOREIGN PATENT DOCUMENTS

| | | |
|---|---|---|
| DE | 1 871 717 | 5/1963 |
| DE | 2348124 A1 | 4/1975 |
| DE | 3334864 A1 | 4/1985 |
| WO | WO 98/41126 | 9/1998 |

* cited by examiner

Primary Examiner—Rodney B. White
(74) Attorney, Agent, or Firm—Crowell & Moring LLP

(57) ABSTRACT

Padding for seats, in particular vehicle seats, has a padded body predetermining the contour of the padded surface, which can be changed. In order to adjust the padded surface contour to support the body of a seated person in an individual and orthopaedically correct manner, avoiding hardening of the padded surface which has an adverse effect on the seat comfort, the padded body is composed, at least in subregions, of a plurality of individual padded segments which are arranged next to one another and can be displaced relative to one another in the direction of the normal of the padded surface. Adjusting elements can displace the padded elements individually.

14 Claims, 4 Drawing Sheets

PADDING FOR SEATS, IN PARTICULAR VEHICLE SEATS

This application claims the priority of German application 101 45 627.1, filed Sep. 15, 2001, the disclosure of which is expressly incorporated by reference herein.

BACKGROUND AND SUMMARY OF THE INVENTION

The present invention relates to padding for seats, in particular vehicle seats, including a padded surface, a padded body predetermining a contour of the padded surface, and means for changing the padded surface contour.

In the case of known seat and/or backrest padding for seats in motor vehicles and aircraft (DE 1 871 717 U1), air-filled, flexible bulges having a predetermined shape are integrated in the padded region of the seat surface of the seat cushion and/or of the backrest and are connected via valve-controlled lines to a compressed-air pump for the introduction of air. By inflation of the bulges to a greater or lesser extent, the shape of the padded surface can be changed and thus support of the seated person's body in an individual manner in certain padded regions can be obtained.

In the case of a known vehicle seat having a padded body which predetermines the shape of the surface (DE 33 34 864 C2), there are a plurality of inflatable elements for correcting the seat profile for the purpose of supporting the seated person in an orthopaedically correct manner. These elements, when inflated, change the shape of the seat surface. The inflatable elements are arranged in depressions which are open towards the surface, are otherwise bounded on all sides by the padded body and the depth of which is approximately equal to the thickness of the uninflated elements. The depressions, which lie next to one another, are separated from one another by supporting ribs. The padded body together with inflatable elements is covered by a padding covering.

Known seat and/or backrest padding for a chair or armchair (DE 23 48 124 A1) is composed of a plurality of padded elements which form a grid having cross rows and can be filled with air and at least some of which are connected to one another via lines containing pressure valves. As a consequence of the change in position of the posterior which occurs when the seated person's posture changes, and the shifting of weight associated therewith, certain padded elements are loaded more than others, in which case then, due to the mutual connection of the interiors of certain padded elements, the volume of air displaced from the padded elements subjected to a relatively strong load passes into the padded elements which communicate therewith and are less loaded, and expands them to a correspondingly stronger degree. This finally brings about the stabilization of the posterior required for the desired positioning of the newly assumed posture. Instead of air, another gaseous or fluid medium may also be used.

All of these paddings with the possibility of changing the surface contour for supporting the seated person in an orthopaedically optimum manner have the disadvantage that the increase in the filling pressure of the medium in the bulges or padded elements causes the seat surface to become hardened and, as a result, the seat comfort is impaired.

The invention is based on the object of improving padding of the type mentioned at the beginning in such a manner that the surface contour can be adjusted to coordinate with a desired support for the seated person's body without the padded surface becoming hardened.

This object is achieved according to the invention by composing the padded body, at least in subregions, of a plurality of individual padded segments which are arranged next to one another and can be displaced relative to one another in a direction of the normal of the padded surface. Adjusting elements can displace the padded segments individually to change the padded surface contour. A process of providing a desired padded surface contour is also claimed.

The padding according to the invention has the advantage that when the surface contour is set in the desired manner, the softness of the padding is maintained because each padded segment is displaced in its entirety without any change in shape. The padded segments are arranged either over the entire padding or only in those subregions of the padding in which specific adjustments of the padded surface are required. Thus, for example, the rear part of the padded area can be realized with a nondisplaceable padded segment while the front part of the padded area reaching as far as the edge of the padding is composed of a plurality of displaceable padded segments. This enables, for example, the padded segments lying under the thighs to be adjusted separately in order to satisfy the different demands made on the leg position. Thus, for example, when there is an automatic transmission of the motor vehicle, a different position of the leg operating the accelerator from the functionless leg which is at rest can be predetermined.

Advantageous embodiments of the padding according to the invention together with expedient developments and refinements of the invention are specified.

According to a preferred embodiment of the invention, a stiff base is arranged on the undersides of each displaceable padded segment. The adjusting elements, which displace the padded segments individually, engage in each case on the base. This stiff base enables the displacement force applied by the adjusting elements to be distributed uniformly over the padded segment. As a result, the displacement force does not lead to a selective hardening of the soft padding material within the padded segment.

According to an advantageous embodiment of the invention, the padded body is covered by an upper padded layer of padding material, and the padded layer is covered by a padding covering. The upper padded layer is stitched loosely onto the padded body, which is brought about in that the upper padded layer is sewn onto the padding covering, and the padding covering is clamped elastically to the padding support which holds the padded body. In this way, the movement of the individual padded segments is possible and does not lead to an increase in the tension of the padding. The elastic bracing can take place either via rubber bands or via an edge zone of flexible material provided in the padding covering.

The invention is described in greater detail below with reference to exemplary embodiments illustrated in the drawings.

DESCRIPTION OF THE PREFERRED EMBODIMENT

Figure 1:
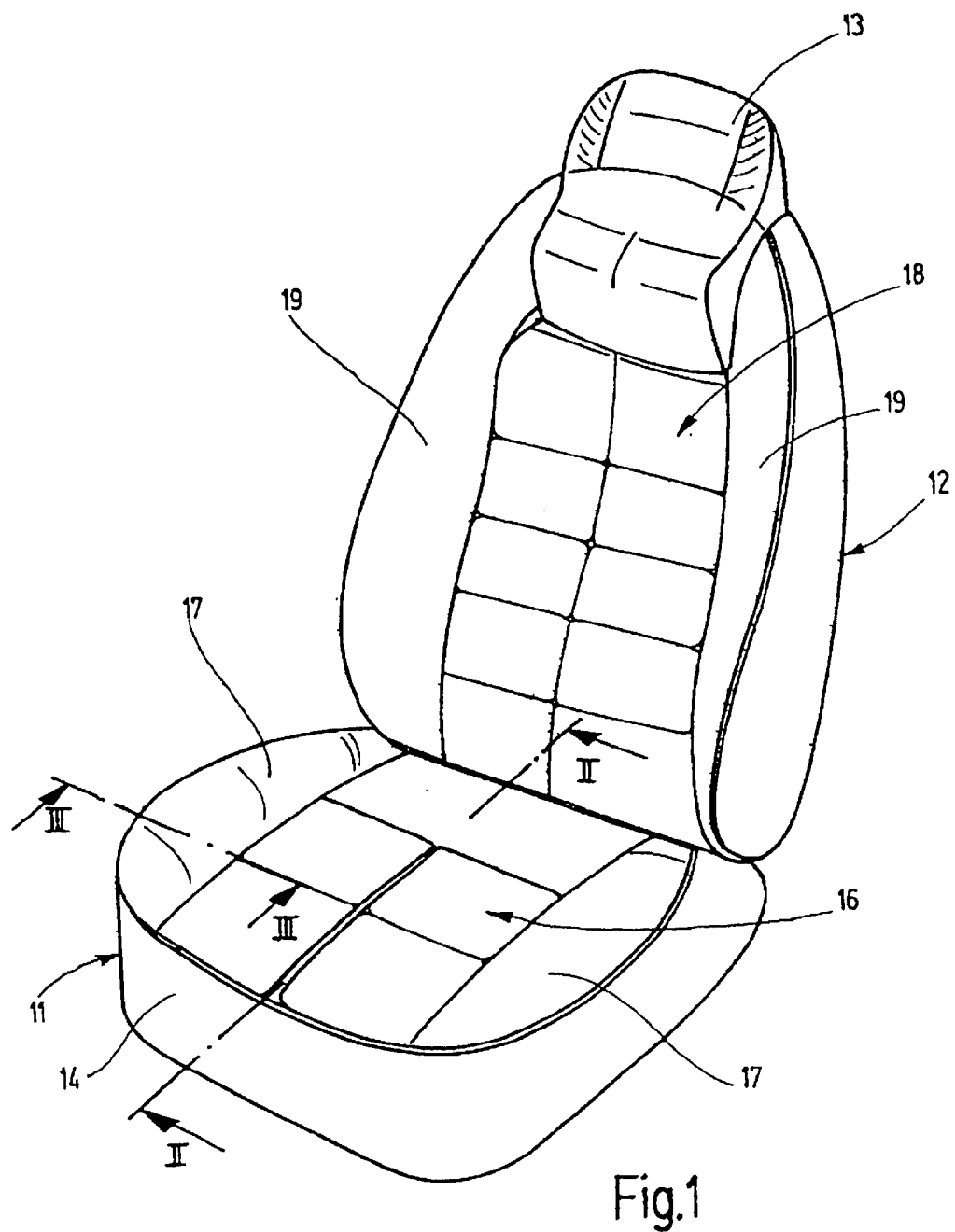
FIG. 1 is a perspective view of a vehicle seat.

The vehicle seat, which is illustrated perspectively in FIG. 1, for a passenger vehicle has, in a known manner, a seat cushion 11, a backrest 12 and a head restraint 13 held in a height-adjustable manner on the backrest 12. The seat cushion 11 is accommodated in a seat framework, which cannot be seen in FIG. 1, and the backrest 12 is held pivotably on the seat framework, so that it can be adjusted in its inclination with respect to the seat cushion 11. The seat cushion 11 has seat padding 14 and the backrest 12 has backrest padding 15 accommodated in a backrest framework. The padded surface of the seat padding 14 has a seat area 16 on whose longitudinal edges "side cheeks" 17 or side members extend in order to support the body laterally when transverse forces occur. In the same manner, the backrest padding 15 has a backrest area 18 which is framed by side bulges 19 likewise used for supporting the body laterally. The construction of the seat padding 14 and backrest padding 15 is virtually identical, and so only the seat padding 14 will be described in detail below, but the designs are applicable in the same manner to the backrest padding 15.

Figure 2:
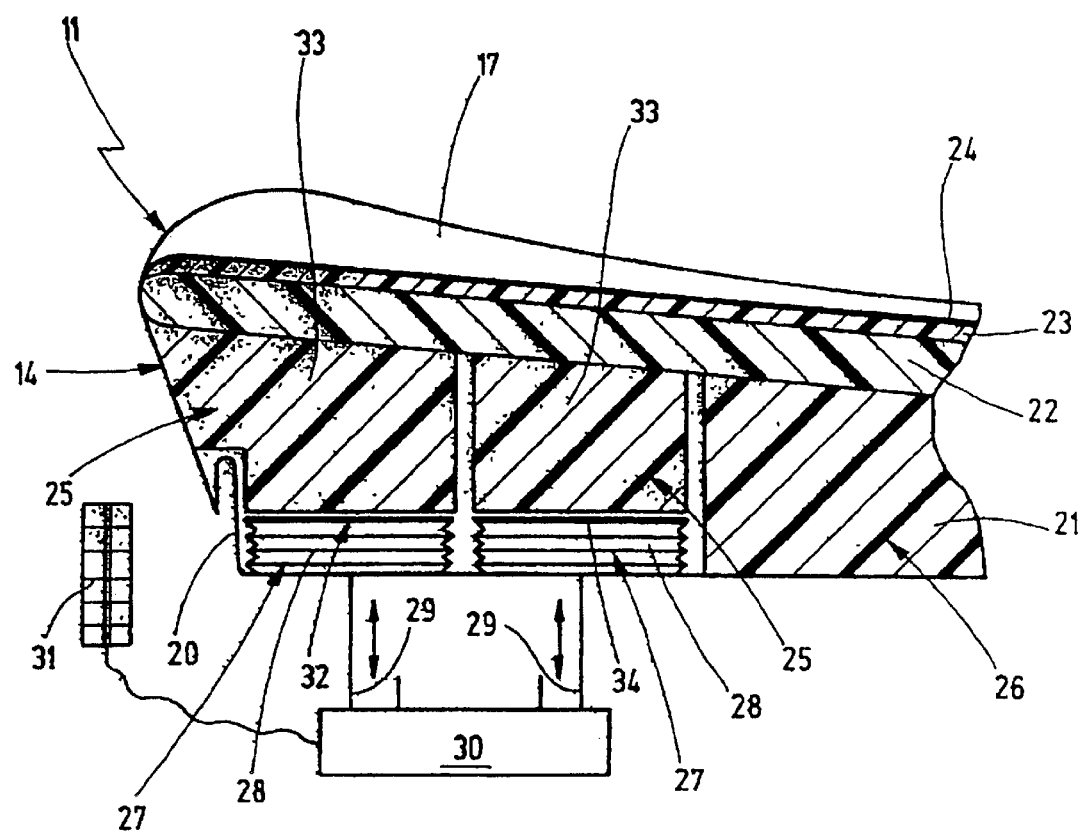
FIG. 2 shows part of a section along line II—II in FIG. 1.
Figure 3:
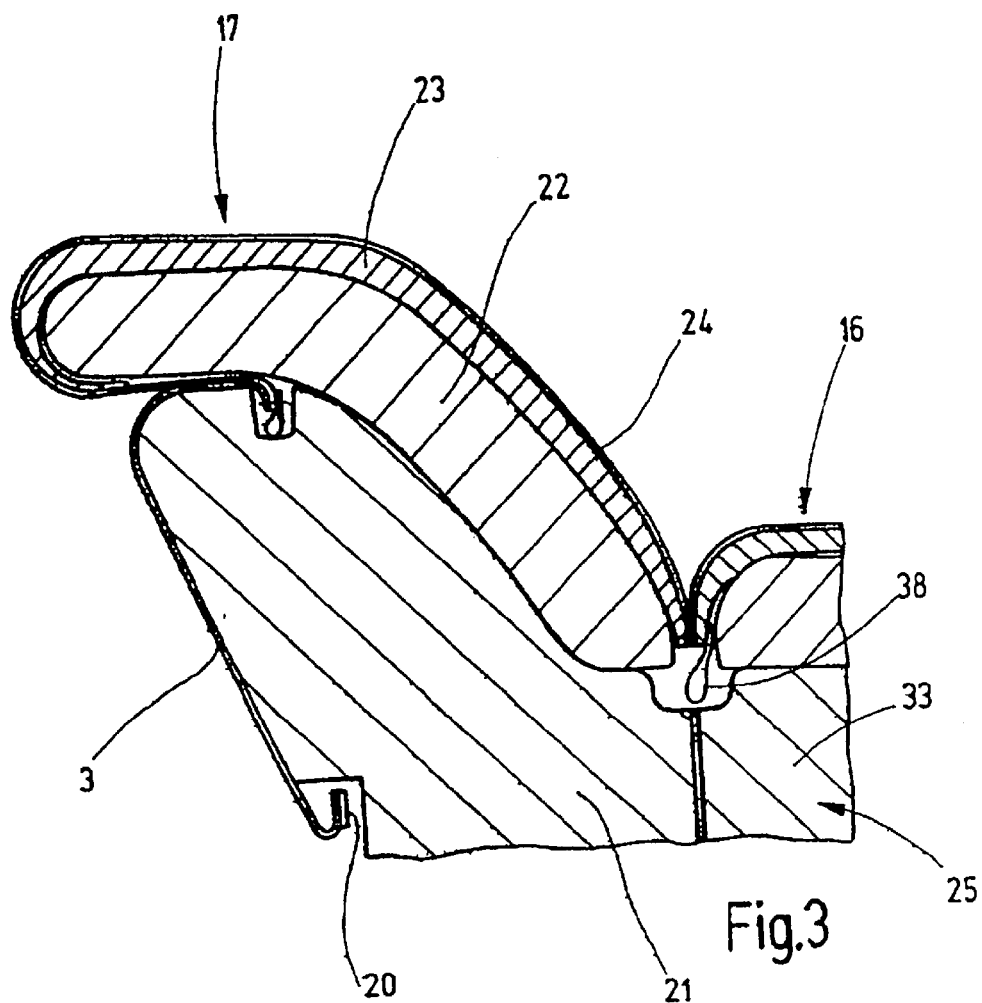
FIG. 3 shows part of a section along line III—III in FIG. 1.

The seat padding 14 is illustrated in each case in part in FIG. 2 in longitudinal section according to the sectional line II—II in FIG. 1 and in FIG. 3 in cross section according to the sectional line III—III in FIG. 1. The seat padding 14 has a padded body 21 which predetermines the contour of the padded surface and rests on a padding support 20, a pressure-distributing layer 22 which covers the padded body 21, an upper padded layer 23, also referred to as covering filling, which rests on the pressure-distributing layer 22, and a padding covering 24 which is stretched over the padded surface and is fixed at the edge to the padding support 20. In the case of actively ventilated padding, there is also a ventilation layer of large-meshed spacer fabric between the padded body 21 and the pressure-distributing layer 22. The padded body 21 consists of solid foam, the pressure-distributing layer 22 of perforated foam, the upper padded layer 23 of a nonwoven or reticulated foam and the padding covering of leather or cloth.

As can be seen in FIG. 2, the padded body 21 is composed, in the region of the seat area 16, of a plurality of individual padded segments 25, 26 which are arranged next to one another and of which the padded segments 25 can be displaced with respect to one another and with respect to the padded segment 26. The fixed padded segment 26 is arranged in that area of the seat padding 14 which is adjacent to the backrest 12, and the displaceable padded segments 25 are arranged in that part of the seat area 16 which reaches as far as the front edge of the seat padding 14. A total of four padded segments 25 fill this part of the seat area 16. The displacement of the padded segments 25 in the direction of the normal with respect to the padded surface is brought about by means of adjusting elements 27 which are arranged on the underside of the padded segments 25. In the exemplary embodiment described here, the adjusting elements 27 are designed as bellows 28 which are supported on the padding support 20, on the one side, and on each padded segment 25, on the other side. The bellows 28 are filled with a fluid or gaseous medium, for example air, which is fed in from a medium store 30 via a line 29. By increasing the filling quantity in the bellows 28, the latter expand and displace the respective padded segment 25 in the direction of the surface of the seat padding 14. The size of the displacement can be set by means of a control unit 31 by, for example, the medium store 30 being activated until the desired height setting of the respective padded segment 25 is reached. The filling quantity passed into the bellows 28 is then kept constant by corresponding shut-off valves. As an alternative, it is possible to adjust the individual padded segments 25 in the same manner using an electric motor.

In order, during displacement of the padded segments 25, to achieve a uniform distribution of force at each padded segment 25, a stiff base 32 is arranged between the underside of each padded segment 25 and the associated adjusting elements 27 in the form of a bellows 28. This stiff base 32 enables the padded segment 25, which consists of the soft padding material, to be displaced as a whole under the effect of a displacement force, with the result that the displacement is not able to result in a selective hardening of the soft padding material, which, in turn, would lead to hardening of the padded surface and therefore to a loss in the seat comfort.

In the exemplary embodiment of FIG. 2, each padded segment 25 consists of a solid block 33 of foam or rubberized hair. The stiff base 32 is formed by a panel 34 on which the solid block 33 rests. The bellows 28 is supported between the panel 34 and the padding support 20.

In order to set a desired contour of the seat padding 14, which contour is advantageous in order to support the seated person's body in an orthopaedically favorable manner, the displaceable padded segments 25 are raised individually by, for example, manual operation of the control unit 31. For example, by raising the four front padded segments 25 in the seat area 16 to a different extent a different support of the thighs of the seated person can be obtained, in order to obtain the different requirements for the functional leg, for driving with automatic transmission, and for the non-functional leg.

In order, during displacement of the various padded segments 25, to prevent a tensioning of the padding which impairs the seat comfort from building up, special stitching is provided for the padding covering 24, which ensures that the individual padded segments 25 can be moved in such a manner that the seat padding 14 does not become hardened as a whole, and any desired stitched image or design image can be illustrated. As FIG. 3 shows, the upper padded layer 23 is stitched loosely onto the padded body 21, for which purpose the upper padded layer 23 is sewn onto the padding covering 24 and the padding covering 24 is braced elastically on the padding support 20. The elastic bracing can take place either via rubber bands or via peripheral edge zones of flexible material on the padding covering 24. For example, the padding covering 24 can be sewn to an edge strip 35 of stretch material. The stitching takes place in a known manner by means of loops 38 in the padded body 21, which loops are sewn onto the padding covering 24.

Figure 5:
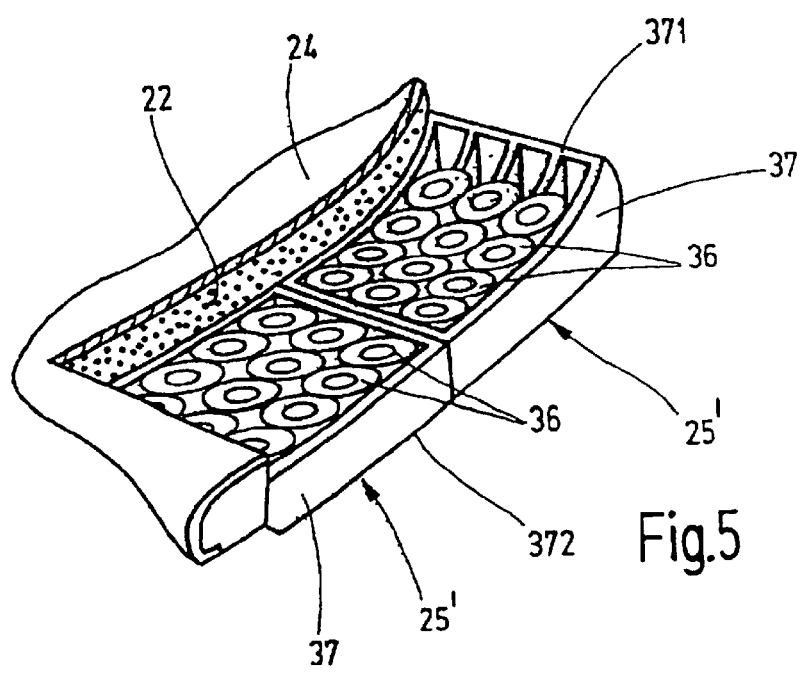
FIG. 5 is a perspective illustration of part of the seat padding of the vehicle seat shown in FIG. 4.
Figure 4:
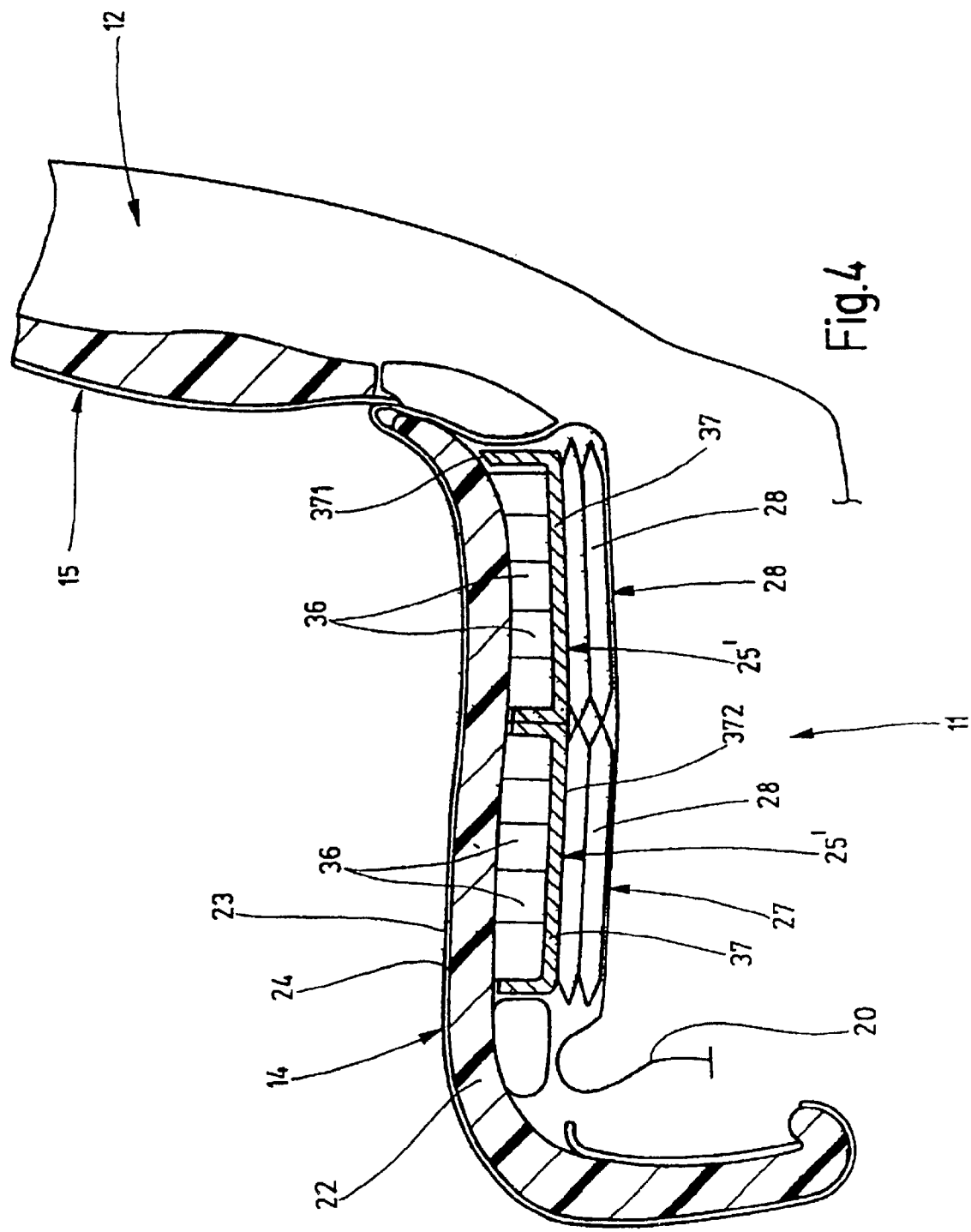
FIG. 4 shows part of a cross section of a vehicle seat according to a further embodiment.

The vehicle seat, part of which is illustrated in longitudinal section in FIG. 4, is modified with regard to its seat padding 14 in comparison with the vehicle seat which is described. Here, the seat padding 14 in the region of the seat area 16 is composed entirely of displaceable padded segments 25' which can be displaced in the direction towards the padded surface by a respective adjusting element 27 in the form of a bellows 28. In contrast to the padded segments 25 according to FIG. 1, which are designed there as solid blocks, each padded segment 25' is composed of a plurality of shaped pieces 36 of foam or rubberized hair which are arranged next to one another. The shaped pieces 36 are inserted into a stiff box 37, which is open towards the padded surface, specifically in such a manner that they protrude somewhat over the box edge 371. An adjusting element 27, which is designed as a bellows 28, is arranged in turn between the box base 372 of each box 37 and the padding support 20. The shaped pieces 36 are designed as solid or hollow cylinders and are inserted into the box 37 with cylinder axes orientated at right angles with respect to the box base 372. The padded segments 25', which can be seen in section in FIG. 4, are illustrated perspectively in FIG. 5.

The shaped pieces 36 are designed here as hollow cylinders. Otherwise, the construction of the padding corresponds with the construction of the seat padding 14 described for FIGS. 1 to 3, and so to this extent identical components are provided with the same reference numbers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Padding for a seat, in particular a vehicle seat, comprising:
    a padded surface,
    a padded body predetermining a contour of the padded surface, and
    means for changing the padded surface contour,
    wherein the padded body is composed, at least in subregions, of a plurality of individual padded segments which are arranged next to one another and can be displaced relative to one another in a direction of the normal of the padded surface,
    wherein the means for changing the padded surface contour have adjusting elements which displace the padded segments individually,
    wherein a stiff base is arranged on an underside of each displaceable padded segment,
    wherein the adjusting elements engage in each case on the base,
    wherein each padded segment has a plurality of shaped pieces of padding material arranged next to one another, and
    wherein the stiff base is formed by a box which is open on its side facing the padded surface and in which the shaped pieces are inserted in such a manner that they protrude over an edge of the box.

2. Padding according to claim 1, wherein the shaped pieces are solid or hollow cylinders which are inserted into the box with cylinder axes orientated at right angles to a base of the box.

3. Padding according to claim 2, wherein the padding material is a foam or rubberized hair.

4. Padding according to claim 2, wherein the adjusting elements are flexible bellows which are filled with a fluid or gaseous medium, are supported in each case between a padded segment and a padding support holding the padded body, and are connected to a control device in order to change their filling volumes.

5. Padding according to claim 2, wherein the adjusting elements are formed by controllable electric servomotors.

6. Padding according to claim 2, wherein the padded body is covered by an upper padded layer of padding material, the upper padded layer is covered by a padding covering, and the upper padded layer is stitched loosely onto the padded body.

7. Padding according to claim 6, wherein the upper padded layer is sewn onto the padding covering and the padding covering is clamped elastically to a padding support.

8. Padding according to claim 7, wherein the padding covering has at least one peripheral edge zone of flexible material.

9. Padding according to claim 1, wherein the padding material is a foam or rubberized hair.

10. Padding according to claim 1, wherein the adjusting elements are formed by controllable electric servomotors.

11. Padding according to claim 1, wherein the adjusting elements are flexible bellows which are filled with a fluid or gaseous medium, are supported in each case between a padded segment and a padding support holding the padded body, and are connected to a control device in order to change their filling volumes.

12. Padding according to claim 1, wherein the padded body is covered by an upper padded layer of padding material, the upper padded layer is covered by a padding covering, and the upper padded layer is stitched loosely onto the padded body.

13. Padding according to claims 12, wherein the upper padded layer is sewn onto the padding covering and the padding covering is clamped elastically to a padding support.

14. Padding according to claim 13, wherein the padding covering has at least one peripheral edge zone of flexible material.

* * * * *